United States Patent
Xu et al.

(10) Patent No.: US 7,083,662 B2
(45) Date of Patent: Aug. 1, 2006

(54) GENERATION OF ELEVATED PRESSURE GAS MIXTURES BY ABSORPTION AND STRIPPING

(75) Inventors: Jianguo Xu, Wrightstown, PA (US); Xiang-Dong Peng, Orefield, PA (US); Harold Henry Gunardson, Lehighton, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 80 days.

(21) Appl. No.: 10/739,970

(22) Filed: Dec. 18, 2003

(65) Prior Publication Data

US 2005/0132884 A1    Jun. 23, 2005

(51) Int. Cl.
*B01D 53/14*   (2006.01)
*B01D 53/62*   (2006.01)

(52) U.S. Cl. .......................... 95/165; 95/169; 95/236; 423/220

(58) Field of Classification Search ................ 95/159, 95/165, 166, 169, 236, 263; 423/220, 228, 423/229; 585/834
See application file for complete search history.

(56) References Cited

U.S. PATENT DOCUMENTS

| | | | |
|---|---|---|---|
| 2,781,863 A | | 2/1957 | Bloch et al. |
| 3,463,603 A | * | 8/1969 | Dunn et al. ................. 423/229 |
| 4,009,083 A | | 2/1977 | Lyon et al. |
| 4,050,909 A | | 9/1977 | Ranke |
| 4,052,176 A | | 10/1977 | Child et al. |
| 4,242,108 A | * | 12/1980 | Nicholas et al. .............. 95/166 |
| 4,834,781 A | * | 5/1989 | Grunewald et al. ........... 95/163 |
| 5,387,277 A | | 2/1995 | Brasier |
| 5,772,734 A | | 6/1998 | Baker et al. |
| 5,851,265 A | | 12/1998 | Burmaster et al. |
| 6,174,506 B1 | | 1/2001 | Chakravarti et al. |
| 6,416,568 B1 | * | 7/2002 | Wallace et al. ................ 95/55 |
| 6,497,852 B1 | * | 12/2002 | Chakravarti et al. ........ 423/228 |
| 6,706,770 B1 | * | 3/2004 | Patel et al. .................. 518/705 |
| 2002/0098132 A1 | | 7/2002 | Vidalin |
| 2003/0203983 A1 | | 10/2003 | O'Rear et al. |
| 2004/0253159 A1 | * | 12/2004 | Hakka et al. ................ 423/228 |

FOREIGN PATENT DOCUMENTS

| | | |
|---|---|---|
| EP | 1 216 744 A1 | 6/2002 |
| JP | 58-208104 A * | 12/1983 |
| WO | WO 86/05474 | 9/1986 |
| WO | WO 2004/080573 A1 | 9/2004 |

OTHER PUBLICATIONS

Agrawal, Rakesh et al., "Separation Devices for Gas Mixing", *AIChE Journal*, Dec. 1995, vol. 41, No. 12, pp 2585-2602.

* cited by examiner

*Primary Examiner*—Frank M. Lawrence
(74) *Attorney, Agent, or Firm*—Keith D. Gourley

(57) ABSTRACT

Method of making a product gas mixture comprising providing a first gas mixture, contacting the first gas mixture with a lean absorber liquid at a first pressure and absorbing a portion of the first gas mixture in the lean absorber liquid to provide a rich absorber liquid and a non-absorbed residual gas, pressurizing the rich absorber liquid provide a pressurized rich absorber liquid, stripping the pressurized rich absorber liquid with a stripping gas at a second pressure greater than the first pressure to provide a pressurized lean absorber liquid and the product gas mixture, and reducing the pressure of the pressurized lean absorber liquid to provide the lean absorber liquid at the first pressure.

20 Claims, 2 Drawing Sheets

GENERATION OF ELEVATED PRESSURE GAS MIXTURES BY ABSORPTION AND STRIPPING

BACKGROUND OF THE INVENTION

The recovery of a gaseous component from a gas mixture in a process and the use of that recovered component in another process is a common operation in the process industries. For example, carbon dioxide is a common constituent of synthesis gas, and carbon dioxide often must be removed before the synthesis gas is introduced into reaction systems for the production of methanol, ammonia, dimethyl ether, and synthetic hydrocarbons. In order to improve the overall carbon utilization of such processes, it is often desirable to recycle carbon dioxide, or in some cases to import carbon dioxide, to be utilized in the feed to one of the upstream reaction systems. In other cases, carbon dioxide can be removed from the synthesis gas and exported for use elsewhere.

In gas separation processes to recover a component or components from a multicomponent feed gas mixture, the recovered components typically are obtained at a pressure below the feed gas pressure. In a distillation process, for example, the product streams are obtained at pressures which are slightly lower than the feed gas pressure due to pressure drop in the distillation column. In a membrane separation process, permeate product gas is recovered at a pressure significantly lower than the feed gas pressure and non-permeate product gas is recovered at pressures which are slightly lower than the feed gas pressure due to pressure drop in the membrane module. In a pressure swing adsorption process, the more strongly adsorbed components are recovered by depressurization to a pressure below the feed pressure and the less strongly adsorbed components are recovered at pressures which are slightly lower than the feed gas pressure due to pressure drop in the adsorbent bed.

A gaseous product recovered from a feed gas mixture in a separation process and used in another process may be required at a pressure higher than the separation process operating pressure. In this case, the gaseous product must be compressed before use in the other process. In order to reduce or eliminate the compression required in this situation, it would be desirable to obtain the gaseous product from the separation process at a pressure above the feed gas pressure and preferably at the pressure required in the other process. Embodiments of the invention described below address this need by providing a gas separation process that can generate a product gas mixture at pressures above the feed gas pressure.

BRIEF SUMMARY OF THE INVENTION

A first embodiment of the invention relates to a method of making a product gas mixture comprising providing a first gas mixture; contacting the first gas mixture with a lean absorber liquid at a first pressure and absorbing a portion of the first gas mixture in the lean absorber liquid to provide a rich absorber liquid and a non-absorbed residual gas; pressurizing the rich absorber liquid provide a pressurized rich absorber liquid; stripping the pressurized rich absorber liquid with a stripping gas at a second pressure greater than the first pressure to provide a pressurized lean absorber liquid and the product gas mixture; and reducing the pressure of the pressurized lean absorber liquid to provide the lean absorber liquid at the first pressure.

The first gas mixture may comprise carbon dioxide and the carbon dioxide may be absorbed in the lean absorber liquid. The first gas mixture may further comprise hydrogen and carbon monoxide; the first gas mixture may be shifted synthesis gas comprising hydrogen and carbon dioxide. The stripping gas may be selected from the group consisting of natural gas, methane, nitrogen, and hydrocarbons containing two or more carbon atoms.

The absorber liquid may be selected from the group consisting of an aqueous solution comprising methylethanolamine (MEA); an aqueous solution comprising methyldiethanolamine (MDEA); a mixture comprising sulfolane, one or more alkanolamines, and water; liquid ammonia; and N-methyl-2-pyrrolidone.

The first pressure may be in the range of 20 to 1500 psia and the second pressure may be in the range of 50 to 2000 psia.

The stripping of the pressurized rich absorber liquid with the stripping gas typically is effected in a stripping column, wherein liquid in the bottom of the stripping column may be heated, and wherein the stripping gas may be heated prior to introduction into the stripping column.

The method of making the product gas mixture may further comprise
  (a) generating crude synthesis gas containing hydrogen, carbon monoxide, and carbon dioxide in a synthesis gas generation process by converting a first portion of a natural gas feed;
  (b) absorbing a portion of the carbon dioxide from the crude synthesis gas in the lean absorber liquid to provide a rich absorber liquid;
  (c) stripping the rich absorber liquid with a second portion of the natural gas feed to provide the product gas mixture, which comprises carbon dioxide and methane; and
  (d) recycling the product gas mixture to the synthesis gas generation process.

The non-absorbed residual gas may be a carbon dioxide-depleted synthesis gas which comprises primarily hydrogen and carbon monoxide.

The method of making the product gas mixture alternatively may further comprise
  (a) generating crude synthesis gas containing hydrogen, carbon monoxide, and carbon dioxide in a synthesis gas generation system by converting a first portion of a natural gas feed;
  (b) introducing the crude synthesis gas into a reaction system and converting the crude synthesis gas into to a reaction product and unreacted synthesis gas comprising carbon dioxide, wherein the unreacted synthesis gas provides the first gas mixture;
  (c) absorbing a portion of the carbon dioxide in the unreacted synthesis gas by the lean absorber liquid to provide the rich absorber liquid;
  (d) stripping the rich absorber liquid with a second portion of the natural gas feed to provide the product gas mixture, which comprises carbon dioxide and methane; and
  (e) recycling the product gas mixture to the synthesis gas generation system.

The product may comprise a component selected from the group consisting of methanol, dimethyl ether, synthetic hydrocarbons Another embodiment of the invention relates to a method for making a synthesis gas product comprising (a) generating a crude synthesis gas containing hydrogen, carbon monoxide, and carbon dioxide in a synthesis gas generation system by converting a first portion of a natural gas feed therein;

(b) absorbing a portion of the carbon dioxide in the crude synthesis gas in a lean absorber liquid to provide a rich absorber liquid and a non-absorbed residual gas, wherein the non-absorbed residual gas is the synthesis gas product;

(c) transferring the rich absorber liquid to a stripping column;

(d) stripping the pressurized rich absorber liquid in the stripping column with a second portion of the natural gas feed to provide a stripped absorber liquid and a stripping column overhead gas comprising carbon dioxide and methane;

(e) recycling the stripping column overhead gas to the synthesis gas generation system; and (f) recycling the stripped absorber liquid to provide the lean absorber liquid in (b).

The liquid in the bottom of the stripping column may be heated and the second portion of the natural gas feed may be heated prior to introduction into the stripping column. The stripping column may be operated at a higher pressure than the pressure of the absorber column, the rich absorber liquid may be pressurized during transfer to the stripping column, and the pressure of the stripped absorber liquid may be reduced prior to recycle to the absorber column.

An alternative embodiment of the invention includes a method for making a reaction product comprising (a) generating a crude synthesis gas containing hydrogen, carbon monoxide, and carbon dioxide in a synthesis gas generation system by converting a first portion of a natural gas feed therein;

(b) introducing the synthesis gas into a reaction system and converting the synthesis gas into the reaction product and unreacted synthesis gas comprising carbon dioxide;

(c) absorbing a portion of the carbon dioxide in the unreacted synthesis gas in a lean absorber liquid in an absorber column to provide a rich absorber liquid;

(d) transferring the rich absorber liquid to a stripping column;

(e) stripping the rich absorber liquid in the stripping column with a second portion of the natural gas feed to provide a stripped absorber liquid and a stripping column overhead gas comprising carbon dioxide and methane;

(f) recycling the stripping column overhead gas to the synthesis gas generation system; and (g) recycling the stripped absorber liquid to the absorber column to provide the lean absorber liquid in (c).

The reaction product may comprise a component selected from the group consisting of methanol, dimethyl ether, and synthetic hydrocarbons. The stripping column may be operated at a higher pressure than the pressure of the absorber column, the rich absorber liquid may be pressurized during transfer to the stripping column, and the pressure of the stripped absorber liquid may be reduced prior to recycle to the absorber column. The liquid in the bottom of the stripping column may be heated and the second portion of the natural gas feed may be heated prior to introduction into the stripping column.

In another embodiment of the invention, hydrogen and a pressurized carbon dioxide-containing gas mixture may be made by a process comprising (a) reforming a hydrocarbon-containing gas to provide a raw synthesis gas containing hydrogen, carbon monoxide, and carbon dioxide;

(b) shifting the raw synthesis gas to convert carbon monoxide into additional hydrogen and carbon dioxide to provide a shifted synthesis gas;

(c) absorbing carbon dioxide from the shifted synthesis gas in a lean absorber liquid in an absorber column to provide a rich absorber liquid and a hydrogen-rich product gas;

(d) pressurizing the rich absorber liquid to provide a pressurized rich absorber liquid and transferring the pressurized rich absorber liquid to a stripping column;

(e) stripping the pressurized rich absorber liquid in the stripping column with a pressurized stripping gas to provide a stripped absorber liquid and a stripping column overhead gas comprising carbon dioxide and stripping gas, wherein the stripping column overhead gas provides the pressurized carbon dioxide-containing gas mixture; and (f) reducing the pressure of the stripped absorber liquid to provide a reduced-pressure stripped absorber liquid and recycling the reduced-pressure stripped absorber liquid to the absorber column to provide the lean absorber liquid in (c).

The pressurized stripping gas may comprise hydrocarbons containing two or more carbon atoms and the pressurized carbon dioxide-containing gas mixture comprises carbon dioxide and hydrocarbons containing two or more carbon atoms. The pressurized carbon dioxide-containing gas mixture may be used for enhanced oil recovery.

In a final embodiment of the invention, a reaction product and a pressurized carbon dioxide-containing gas mixture may be made by a method comprising (a) generating a crude synthesis gas containing hydrogen, carbon monoxide, and carbon dioxide;

(b) introducing the crude synthesis gas into a reaction system and converting the crude synthesis gas into the reaction product and unreacted synthesis gas comprising carbon dioxide;

(c) absorbing a portion of the carbon dioxide in the unreacted synthesis gas in a lean absorber liquid in an absorber column to provide a rich absorber liquid;

(d) pressurizing the rich absorber liquid to provide a pressurized rich absorber liquid and transferring the pressurized rich absorber liquid to a stripping column;

(e) stripping the rich absorber liquid in the stripping column with a pressurized stripping gas to provide a stripped absorber liquid and a stripping column overhead gas comprising carbon dioxide and stripping gas, wherein the stripping column overhead gas provides the pressurized carbon dioxide-containing gas mixture; and (f) reducing the pressure of the stripped absorber liquid to provide a reduced-pressure stripped absorber liquid and recycling the reduced-pressure stripped absorber liquid to the absorber column to provide the lean absorber liquid in (c).

The pressurized stripping gas may comprise hydrocarbons containing two or more carbon atoms and the pressurized carbon dioxide-containing gas mixture may comprise carbon dioxide and hydrocarbons containing two or more carbon atoms. The pressurized carbon dioxide-containing gas mixture may be used for enhanced oil recovery.

DETAILED DESCRIPTION OF THE INVENTION

An embodiment of the present invention includes a method of providing a product gas mixture by contacting a feed gas mixture with a lean absorber liquid at a first pressure and absorbing a portion of the feed gas mixture in the lean absorber liquid to provide a rich absorber liquid and a non-absorbed residual gas. The rich absorber liquid may be pumped or pressurized to provide a pressurized rich absorber liquid, and the pressurized rich absorber liquid is stripped with a stripping gas at a second pressure, wherein the second pressure may be greater than the first pressure, to provide a lean absorber liquid and the product gas mixture. The pressure of the pressurized lean absorber liquid may be reduced if necessary to provide the lean absorber liquid at the first pressure for recycle to the absorber. The product gas mixture may be utilized in an external process, wherein the external process may operate at a pressure higher than the pressure of the feed gas mixture.

Figure 1:
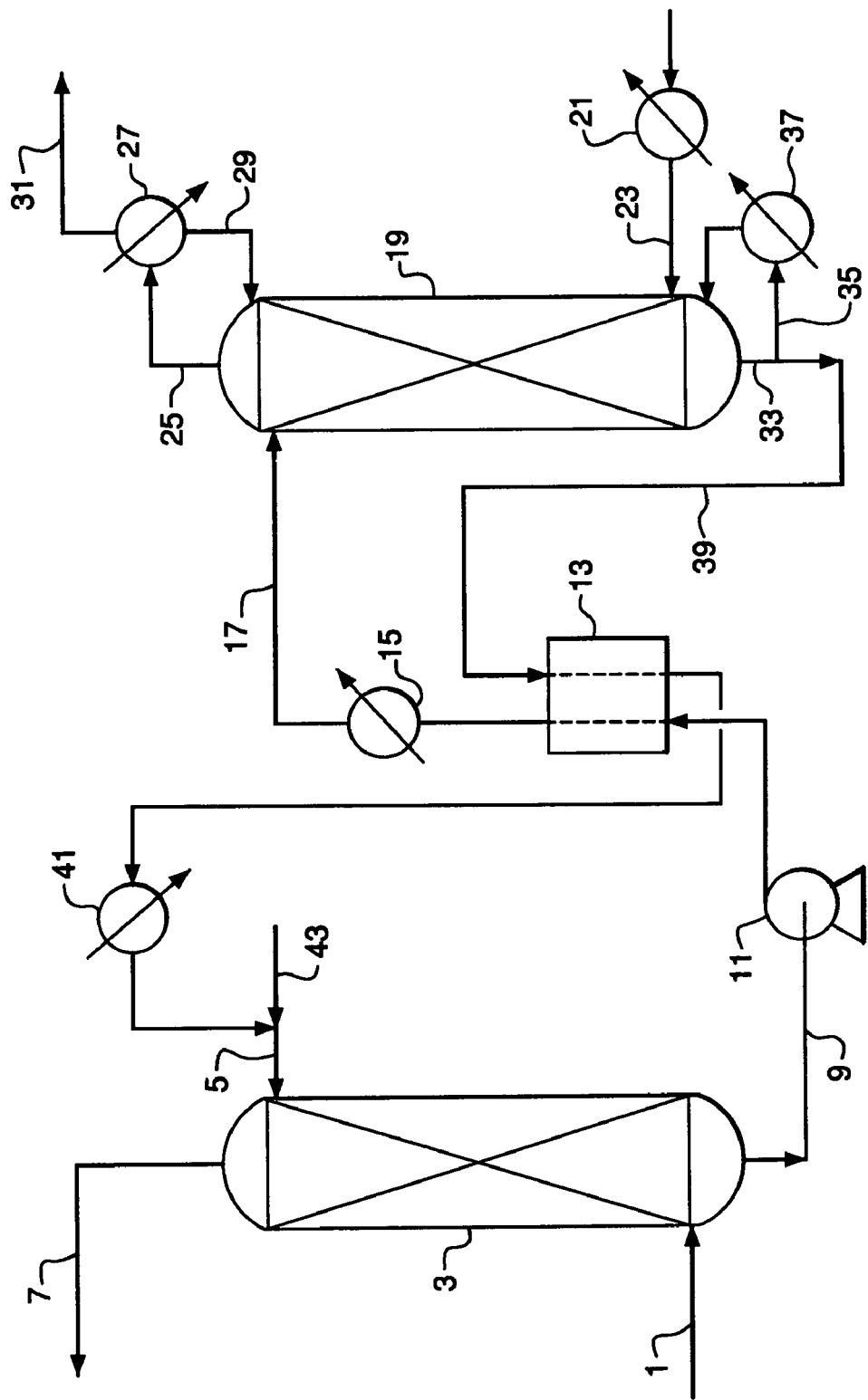
FIG. 1 is a schematic process flow diagram illustrating a separation process in an embodiment of the present invention.

An embodiment of the process is illustrated in FIG. 1. Feed gas mixture 1, which may contain two or more components, is introduced into the bottom of absorber 3. A lean absorber liquid is introduced via line 5 into absorber 3 and the absorber liquid flows downward therein to selectively absorb the more soluble component or components in the feed gas. Absorber 3 may utilize any appropriate mass transfer internals such as trays, structured packing, or random packing as known in the art. An overhead gas product containing the least soluble components is withdrawn via line 7 and a rich absorber liquid bottoms stream enriched in the most soluble components is withdrawn via line 9. Absorber 3 typically operates between 20 and 1500 psia and may operate between 60 and 500 psia.

The rich absorber liquid in line 9 optionally is pressurized in pump 11, the optionally pressurized rich absorber liquid may be heated in heat exchanger 13 and/or heater 15, and the optionally pressurized and optionally heated rich absorber liquid in line 17 is introduced near the top of stripping column 19. Stripping gas is optionally heated in heater 21 and introduced via line 23 near the bottom of stripping column 19 and flows upward therein to promote the vaporization of the most volatile components (e.g., those components absorbed in absorber 3) into the stripping gas. Overhead gas is withdrawn via line 25 and is optionally cooled in cooler 27 to provide reflux via line 29. Stripping column overhead product gas, which is a mixture of the stripping gas introduced via line 23 and the soluble components absorbed in absorber 3 from feed gas 1, is withdrawn via product line 31.

Lean absorber liquid, depleted of the soluble components that are removed in the overhead product gas, leaves stripping column 19 via line 33. Optionally, a portion of the lean absorber liquid is taken through line 35, at least partially vaporized in heater 37, and returned to the bottom of stripping column 19. In another optional step, heated stripping gas in line 23, instead of being introduced directly into stripper column 19, is introduced into heat exchanger 37 where is combined with vaporized lean absorber liquid. Alternatively, heater 21 is not used and the stripping gas is heated in exchanger 37 with the vaporizing lean absorber liquid. The lean absorber liquid in line 39 is optionally cooled against rich absorber liquid in heat exchanger 13 and optionally cooled in cooler 41, combined with makeup absorber liquid from line 43, and returned to absorber 3.

Stripping column 19 typically operates in the range of 50 to 2000 psia, may operate in the range of 100 to 900 psia, and may operate at a higher pressure than the pressure in absorber 3. The overall process of FIG. 1 thus effects the transfer of soluble components from the feed gas in line 1 into the stripping column product gas in line 31, optionally at an increased pressure. When the product gas in line 31 is transferred to a downstream process operating at a higher pressure than the feed gas pressure in line 1, the use of the absorber-stripper described above may reduce or eliminate the gas compression that would be required if the gas separation were effected by a conventional separation process in which the product gas is at or below the feed gas pressure.

The type of absorber liquid and the components in the stripping gas are determined by the actual components in the feed gas in line 1 and the components in the product gas in line 31 required in the downstream process. The process described above may be used, for example, to remove carbon dioxide from a feed gas in line 1 and provide a process gas product containing recovered carbon dioxide and stripping gas at elevated pressure in line 31.

Figure 2:
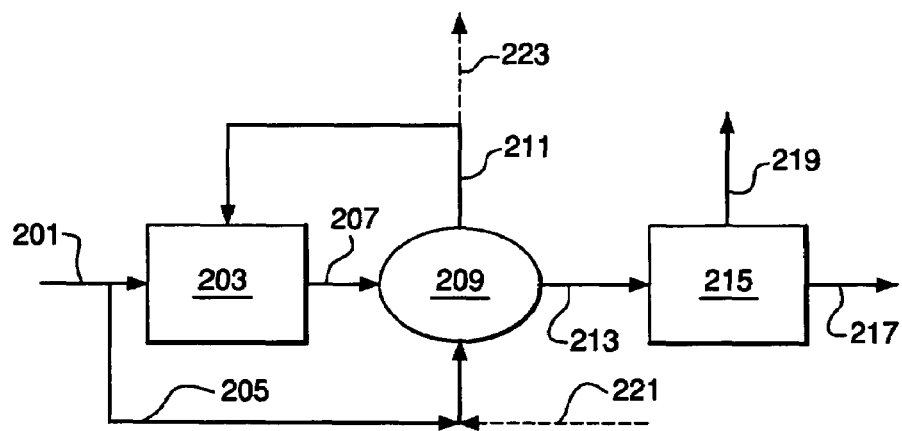
FIG. 2 is a schematic flow diagram of an application embodiment of the present invention.

An exemplary application of the process of FIG. 1 is illustrated in FIG. 2. A portion of a natural gas feed stream in line 201 is introduced into synthesis gas generation system 203 and another portion is withdrawn via line 205 for another use described below. Raw synthesis gas comprising hydrogen, carbon monoxide, and carbon dioxide is withdrawn via line 207. Synthesis gas generation system 203 may be a steam-methane reformer, a partial oxidation reactor, an autothermal reformer, or a combination thereof. Carbon dioxide is removed from the raw synthesis gas in carbon dioxide removal system 209, which typically is the system of FIG. 1 as described earlier. The portion of the natural gas feed in line 205 is used as the stripping gas in system 209 as earlier described, and the stripping column overhead gas containing carbon dioxide and non-absorbed components from the natural gas is recycled via line 211 to synthesis gas generation system 203.

The absorber liquid may be any solvent that absorbs carbon dioxide, and typically is any of the solvents used in commercially-available carbon dioxide removal processes. These solvents may include, for example, aqueous solutions comprising methylethanolamine (MEA) or methyldiethanolamine (MDEA), propylene carbonate, a mixture comprising sulfolane, alkanolamine, and water (used in the Sulfinol process), refrigerated liquid methanol (used in the Rectisol® process), and N-methyl-2-pyrrolidone (used in the Purisol® process).

The pressure of the raw synthesis gas in line 207, and thus the pressure of the absorber column in carbon dioxide removal system 209, typically is less than the inlet pressure of synthesis gas generation system 203 due to pressure drop therein. In this embodiment, the pressure of the natural gas in line 205 is higher than the absorber pressure, and the stripping column would be operated at a higher pressure than the absorber column. In this case, the rich absorber liquid would be pressurized prior to the stripping column and the pressure of the lean absorber liquid would be reduced prior to recycle to the absorber column. In an alternative embodiment, it may be desirable to operate the stripping column at a lower pressure than that of the absorber column, and in this case the rich absorber liquid would be reduced in pressure prior to the stripping column and the pressure of the lean absorber liquid would be increased prior to recycle to the absorber column.

Final synthesis gas product (i.e., the absorber column overhead) is withdrawn via line 213 and may be converted to a liquid product in synthesis gas conversion system 215, which may be, for example, a methanol synthesis system, a dimethyl ether synthesis system, or a Fischer-Tropsch hydrocarbon synthesis system that generates a synthetic hydrocarbon product. The liquid product withdrawn via line 217 then would be methanol, dimethyl ether, or a synthetic hydrocarbon product, respectively. Unreacted synthesis gas is withdrawn via line 219.

In an alternative embodiment, the carbon dioxide recovered in carbon dioxide removal system 209 may be used externally rather than recycled to synthesis gas generation system 203. In this embodiment, natural gas in line 205 is not used for stripping; instead, a pressurized stripping gas is imported via line 221 and all of the stripping column overhead is withdrawn as a pressurized product containing carbon dioxide and stripping gas via line 223. In this embodiment, the stripping gas may be a hydrocarbon stream containing ethane and optionally heavier hydrocarbons up to about five carbon atoms. The stripping column overhead gas containing hydrocarbons and carbon dioxide in line 223 may be utilized, after compression if required, in enhanced oil recovery operations. Alternatively, the stripping gas may be high pressure nitrogen.

Figure 3:
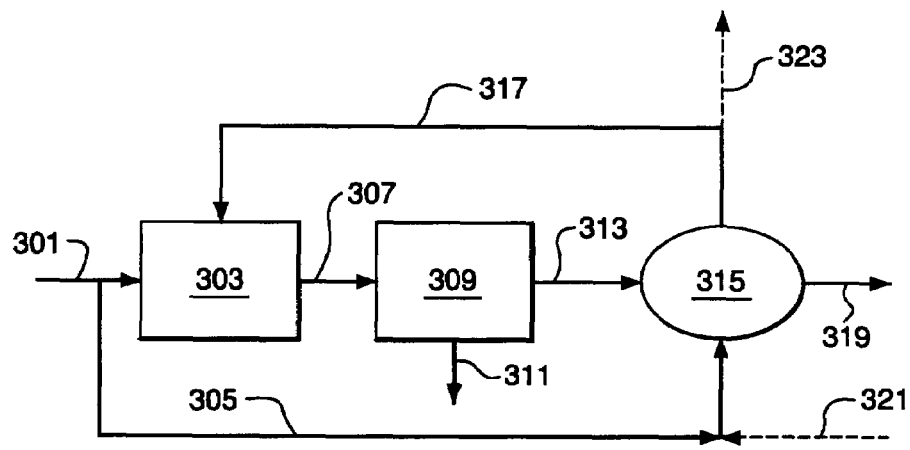
FIG. 3 is a schematic flow diagram of a second application embodiment of the present invention.

Another exemplary application of the process of FIG. 1 is illustrated in FIG. 3. A portion of a natural gas feed stream in line 301 is introduced into synthesis gas generation system 303 and another portion is withdrawn via line 305 for another use described below. Synthesis gas comprising hydrogen, carbon monoxide, and carbon dioxide is withdrawn via line 307. Synthesis gas generation system 303 may be a steam-methane reformer, a partial oxidation reactor, an autothermal reforming reactor, or a combination thereof. The synthesis gas in line 307 is converted to a liquid product in synthesis gas conversion system 309, which may be, for example, a methanol synthesis system, a dimethyl ether synthesis system, or a Fischer-Tropsch hydrocarbon synthesis system. The liquid product withdrawn via line 311 then would be methanol, dimethyl ether, or synthetic hydrocarbon products, respectively. Unreacted synthesis gas is withdrawn via line 313.

Carbon dioxide is removed from the unreacted synthesis gas in carbon dioxide removal system 315, which typically is the system of FIG. 1 as described earlier. The portion of the natural gas feed in line 305 is used as the stripping gas in system 315 as earlier described, and the stripping column overhead gas containing methane and carbon dioxide is recycled via line 317 to synthesis gas generation system 303. The absorber liquid may be any solvent that absorbs carbon dioxide and typically is any of the solvents used in commercially-available carbon dioxide removal processes. These solvents may include, for example, aqueous solutions comprising methylethanolamine (MEA) or methyldiethanolamine (MDEA), propylene carbonate, a mixture comprising sulfolane, alkanolamine, and water (used in the Sulfinol process), refrigerated liquid methane (used in the Rectisol® process), and N-methyl-2-pyrrolidone (used in the Purisol® process).

The pressure of the raw synthesis gas in line 313, and thus the pressure of the absorber column in carbon dioxide removal system 315, typically is less than the inlet pressure of synthesis gas generation system 303 due to pressure drop through synthesis gas generation system 303 and synthesis gas conversion system 309. In this embodiment, the pressure of the natural gas in line 305 is higher than the absorber pressure, and the stripping column would be operated at a higher pressure than the absorber column. In this case, the rich absorber liquid would be pressurized prior to the stripping column and the pressure of the lean absorber liquid would be reduced prior to recycle to the absorber column. In an alternative embodiment, it may be desirable to operate the stripping column at a lower pressure than that of the absorber column, and in this case the rich absorber liquid would be reduced in pressure prior to the stripping column and the pressure of the lean absorber liquid would be increased prior to recycle to the absorber column. Carbon dioxide-free unreacted synthesis gas is withdrawn via line 319.

In an alternative embodiment, the carbon dioxide recovered in carbon dioxide removal system 315 may be used externally rather than recycled to synthesis gas generation system 303. In this embodiment, natural gas in line 305 is not used for stripping; instead, a pressurized stripping gas is imported via line 321 and all of the stripping column overhead is withdrawn via line 323 as a pressurized product containing carbon dioxide and stripping gas. In this embodiment, the stripping gas may be a hydrocarbon stream containing ethane and optionally heavier hydrocarbons up to about five carbon atoms. The stripping column overhead gas containing hydrocarbons and carbon dioxide in line 323 may be utilized, after compression if required, in enhanced oil recovery operations. Alternatively, the stripping gas may be high pressure nitrogen.

Figure 4:
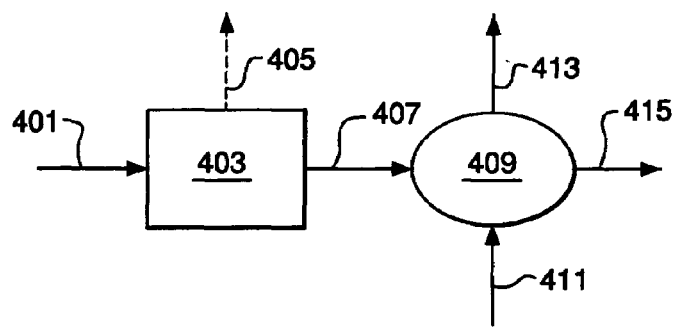
FIG. 4 is a schematic flow diagram of a third application embodiment of the present invention.

A third exemplary application of the process of FIG. 1 is illustrated in FIG. 4. In this embodiment, a hydrocarbon-containing gas, for example, natural gas, is introduced via line 401 into reforming system 403 wherein the gas is converted into synthesis gas containing hydrogen and carbon oxides, the synthesis gas is subjected to water-gas shift in order to convert carbon monoxide into additional hydrogen and carbon dioxide, and a shifted synthesis gas comprising chiefly hydrogen and carbon dioxide is withdrawn via line 407.

In this embodiment, the carbon dioxide may be recovered for enhanced oil recovery applications in oil field production. Carbon dioxide-containing offgas in line 407 is processed in carbon dioxide removal system 409, which typically is the system of FIG. 1 as described earlier. The absorber liquid in this application may be any of the solvents described earlier. A pressurized stripping gas is imported via line 411 and all of the stripping column overhead is withdrawn via line 413 as a pressurized product containing carbon dioxide and stripping gas. Crude hydrogen product is withdrawn via line 415 for final purification to yield a high purity hydrogen product. In this embodiment, the stripping gas may be a hydrocarbon stream containing ethane and optionally heavier hydrocarbons up to about five carbon atoms. The stripping column overhead gas containing hydrocarbons and carbon dioxide in line 323 may be utilized, after compression if required, in enhanced oil recovery operations. Alternatively, the stripping gas may be high pressure nitrogen, methane, or natural gas.

Since gases used in enhanced oil recovery are required at high pressures (for example, up to 5,000 psia), it is desirable to provide the stripping gas in lines 221, 321, and 411 at elevated pressures to minimize the additional compression of the gas in lines 223, 323, and 413 required to inject the carbon dioxide-containing gas into oil-bearing formations in the oil field. In these embodiments, therefore, it is likely that the stripping column will be operated at a significantly higher pressure than the absorber column in carbon dioxide removal systems 209, 309, and 409.

Another embodiment related to the embodiment described above with reference to FIG. 4 can be envisioned wherein a process 403 is operated in or near an oil or gas field. Process 403 could, for example, convert a hydrocarbon stream provided in line 401 to yield a product stream (for example, methanol, dimethyl ether, or synthetic hydrocarbons) in line 405 and significant amounts of carbon dioxide-containing offgas in line 407. If the flaring of this offgas stream (if it contains significant amounts of hydrocarbons) or the direct venting of this offgas stream to the atmosphere is problematic due to restrictions on greenhouse gas emissions, the process described above could be utilized to inject the carbon dioxide-containing stream into underground formations in the oil or gas field. This could be accomplished by utilizing produced gas from the oil or gas field as the stripping gas in line 411 for carbon dioxide removal system 409. The stripping column overhead gas in line 413 could be reinjected with minimum compression requirements. In this embodiment, the stripping column in carbon dioxide removal system 409 would be operated at a significantly higher pressure than the absorber column.

The following Examples illustrate embodiments of the present invention but do not limit the invention to any of the specific details described therein.

EXAMPLE 1

Process simulations of the process of FIG. 1 were carried out using ASPEN software to illustrate the recovery of a mixture of $CO_2$ and $C_2H_6$ by treating hydrogen production offgas by absorption and stripping wherein $C_2H_6$ is used as the stripping gas. The hydrogen is produced by steam reforming natural gas and subjecting the reformate to water gas shift to maximize hydrogen yield. The offgas from the hydrogen plant is fed to absorber column 3 (FIG. 1) via line 1 at 95° F. and 450 psia and has a composition (in mole %) of 75.1% $H_2$, 16.4% $CO_2$, 6.1% $CH_4$, and 2.4% CO. A solvent containing 40 weight % of methyldiethanolamine (MDEA) and 60 weight % of water is provided as the lean absorber liquid in line 5. The absorber column is operated at 450 psia. The $CO_2$ concentration in the treated gas withdrawn via line 7 is 0.1 mole %.

The $CO_2$-rich solvent in line 9 is heated by heat exchange with the stripper bottom stream (line 39) in heat exchanger 13 and the heated solvent is introduced into the top of stripping column 19. The reboiler temperature at the bottom of the stripping column is maintained at 266° F. $C_2H_6$ stripping gas is introduced into the bottom of stripping column 19. The overhead stream in line 25 is partially condensed and the condensate is returned to the column via line 29 as reflux. The stripping column is operated at three different operating pressures wherein the stripping gas is provided at 200, 400, and 600 psia. Pump 11 is used to pressurize the rich absorber liquid in line 9 when the stripping column is operated at 600 psia and a throttling valve (not shown) is used to reduce the pressure of the rich absorber liquid when the stripping column is operated at 200 and 400 psia. The stripping column overhead gas in line 31 withdrawn during operation at each of these three stripping gas pressures has the following compositions (in mole %): 50.3% $CO_2$, 47.1% $C_2H_6$, and 2.4% $H_2O$ for stripping gas at 200 psia; 29.8% $CO_2$, 69.0% $C_2H_6$, and 1.0% $H_2O$ for stripping gas at 400 psia; and 21.8% $CO_2$, 77.1% $C_2H_6$, and 1.0% $H_2O$ for stripping gas at 600 psia. These stripping column overhead streams are recovered at pressures slightly lower than the stripping gas pressures due to pressure drop in the stripping column.

EXAMPLE 2

The system of FIG. 1 was simulated as above except that (1) no stripping gas is used and instead the reboiler 37 is operated at 266° F. and generates steam to effect stripping and (2) the stripping column is operated at 73 psia. The product gas from the stripping column in line 31 has a composition of 94.4 mole % $CO_2$ and 5.2 mole % $H_2O$. Without the use of a high pressure stripping gas, the recovered stripper overhead gas is recovered at a relatively low pressure and considerable compression would be needed to use this gas, for example, for enhanced oil recovery.

EXAMPLE 3

The simulation of Example 1 was repeated except that the feed to the stripping column ($CO_2$-rich solvent) is further heated to 266° F. in heater 15 prior to introduction into stripping column 19, and the stripping column is operated at 400 psia. All other conditions are maintained the same as in Example 1. Additional heating of the stripping column feed yields a stripping column overhead gas containing 44.2 mole % $CO_2$, which is significantly higher than the overhead gas containing 29.8 mole % in Example 1 without the additional heating. This additional heating of the stripping column feed gas is advantageous when higher $CO_2$ concentrations are required in the stripping column overhead product and/or when there is a limited amount of stripping gas available.

EXAMPLE 4

Process simulations of the process of FIG. 1 were carried out using ASPEN software to illustrate use of the invention for treating a typical offgas from a Fisher-Tropsch process to convert natural gas to synthetic hydrocarbons. In this Example, a Fischer-Tropsch offgas with a composition (in mole %) of 51.5% $CO_2$, 26.3% $H_2$, 13.4% CO, and 6.7% $CH_4$ at 100° F. and 284 psia is provided via line 1 to absorber column 3. A solvent containing 40 weight % methyldiethanolamine (MDEA) and 60 weight % water is introduced via line 5 to remove $CO_2$ from the feed gas. The column is operated at 280 psia and the $CO_2$ concentration in the treated offgas in line 7 is 0.1 mole %.

The $CO_2$-rich solvent in line 9 is heated in heat exchanger 13 by heat exchange with the stripper bottoms stream in line 39 and is fed to stripping column 19. The temperature of stripping column reboiler 37 is maintained at 266° F. and the pressure at the bottom of the column is 85 psia. The heated $CO_2$-rich solvent is regenerated using the heat and steam from reboiler 37 and no stripping gas is used. The overhead stream in line 25 is partially condensed and condensate is returned to the column via line 29 as reflux. The product gas in line 31 from the stripping column contains 99.3% $CO_2$ and 0.6% water. Recycling this recovered $CO_2$ to another process will require compression if the $CO_2$ is needed above 85 psia.

EXAMPLE 5

The simulation of Example 4 was repeated at the same conditions except that natural gas at 450 psia is introduced as a stripping gas into reboiler 37 of the stripping column. The column is operated at 450 psia with the bottom temperature at 266° F. Rich absorber liquid in line 9 is pressurized by pump 11 before heating in heat exchanger 13. The resulting $CO_2$—$CH_4$ overhead product gas in line 31 contains (in mole %) 34.1% $CO_2$, 65.2% $CH_4$, and 0.7% $H_2O$ at slightly less than 450 psia. This mixture may be recycled to the synthesis gas generation unit without further compression.

What is claimed is:

1. A method of making a product gas mixture comprising:
   (a) providing a first gas mixture;
   (b) contacting the first gas mixture with a lean absorber liquid at a first pressure and absorbing a portion of the first gas mixture in the lean absorber liquid to provide a rich absorber liquid and a non-absorbed residual gas;
   (c) pressurizing the rich absorber liquid provide a pressurized rich absorber liquid to;
   (d) stripping the pressurized rich absorber liquid with a stripping gas at a second pressure greater than the first pressure to provide a pressurized lean absorber liquid and the product gas mixture; and
   (e) reducing the pressure of the pressurized lean absorber liquid to provide the lean absorber liquid at the first pressure in (b);
   wherein the first gas mixture comprises carbon dioxide and the carbon dioxide is absorbed in the lean absorber liquid, and wherein the first gas mixture further comprises hydrogen and carbon monoxide.

2. The method of claim 1 wherein the first gas mixture is shifted synthesis gas comprising hydrogen and carbon dioxide.

3. The method of claim 1 wherein the stripping gas is selected from the group consisting of natural gas, methane, nitrogen, and hydrocarbons containing two or more carbon atoms.

4. A method of making a product gas mixture comprising:
   (a) providing a first gas mixture;
   (b) contacting the first gas mixture with a lean absorber liquid at a first pressure and absorbing a portion of the first gas mixture in the lean absorber liquid to provide a rich absorber liquid and a non-absorbed residual gas;
   (c) pressurizing the rich absorber liquid provide a pressurized rich absorber liquid to;
   (d) stripping the pressurized rich absorber liquid with a stripping gas at a second pressure greater than the first pressure to provide a pressurized lean absorber liquid and the product gas mixture; and
   (a) reducing the pressure of the pressurized lean absorber liquid to provide the lean absorber liquid at the first pressure in (b);
   wherein the method further comprises
   (f) generating crude synthesis gas containing hydrogen, carbon monoxide, and carbon dioxide in a synthesis gas generation process by converting a first portion of a natural gas feed;
   (g) absorbing a portion of the carbon dioxide from the crude synthesis gas in the lean absorber liquid to provide a rich absorber liquid;
   (h) stripping the rich absorber liquid with a second portion of the natural gas feed to provide the product gas mixture, which comprises carbon dioxide and methane; and
   (i) recycling the product gas mixture to the synthesis gas generation process.

5. The method of claim 4 wherein the non-absorbed residual gas is a carbon dioxide-depleted synthesis gas which comprises primarily hydrogen and carbon monoxide.

6. A method of making a product gas mixture comprising:
   (a) providing a first gas mixture;
   (b) contacting the first gas mixture with a lean absorber liquid at a first pressure and absorbing a portion of the first gas mixture in the lean absorber liquid to provide a rich absorber liquid and a non-absorbed residual gas;
   (c) pressurizing the rich absorber liquid provide a pressurized rich absorber liquid to;
   (d) stripping the pressurized rich absorber liquid with a stripping gas at a second pressure greater than the first pressure to provide a pressurized lean absorber liquid and the product gas mixture; and
   (e) reducing the pressure of the pressurized lean absorber liquid to provide the lean absorber liquid at the first pressure in (b);
   wherein the method further comprises
   (f) generating crude synthesis gas containing hydrogen, carbon monoxide, and carbon dioxide in a synthesis gas generation system by converting a first portion of a natural gas feed;
   (g) introducing the crude synthesis gas into a reaction system and converting the crude synthesis gas into to a reaction product and unreacted synthesis gas comprising carbon dioxide, wherein the unreacted synthesis gas provides the first gas mixture;
   (h) absorbing a portion of the carbon dioxide in the unreacted synthesis gas by the lean absorber liquid to provide the rich absorber liquid;
   (i) stripping the rich absorber liquid with a second portion of the natural gas feed to provide the product gas mixture, which comprises carbon dioxide and methane; and
   (j) recycling the product gas mixture to the synthesis gas generation system.

7. The method of claim 6 wherein the reaction product comprises a component selected from the group consisting of methanol, dimethyl ether, synthetic hydrocarbons.

8. A method of making a synthesis gas product comprising:
   (a) generating a crude synthesis gas containing hydrogen, carbon monoxide, and carbon dioxide in a synthesis gas generation system by converting a first portion of a natural gas feed therein;
   (b) absorbing a portion of the carbon dioxide in the crude synthesis gas in a lean absorber liquid to provide a rich absorber liquid and a non-absorbed residual gas, wherein the non-absorbed residual gas is the synthesis gas product;
   (c) transferring the rich absorber liquid to a stripping column;
   (d) stripping the rich absorber liquid in the stripping column with a second portion of the natural gas feed to provide a stripped absorber liquid and a stripping column overhead gas comprising carbon dioxide and methane;
   (e) recycling the stripping column overhead gas to the synthesis gas generation system; and
   (f) recycling the stripped absorber liquid to provide the lean absorber liquid in (b).

9. The method of claim 8 wherein liquid in the bottom of the stripping column is heated, and wherein the second portion of the natural gas feed is heated prior to introduction into the stripping column.

10. The process of claim 8 wherein the stripping column is operated at a higher pressure than the pressure of the absorber column, the rich absorber liquid is pressurized during transfer to the stripping column, and the pressure of the stripped absorber liquid is reduced prior to recycle to the absorber column.

11. A method of making a reaction product comprising
(a) generating a crude synthesis gas containing hydrogen, carbon monoxide, and carbon dioxide in a synthesis gas generation system by converting a first portion of a natural gas feed therein;
(b) introducing the synthesis gas into a reaction system and converting the synthesis gas into the reaction product and unreacted synthesis gas comprising carbon dioxide;
(c) absorbing a portion of the carbon dioxide in the unreacted synthesis gas in a lean absorber liquid in an absorber column to provide a rich absorber liquid;
(d) transferring the rich absorber liquid to a stripping column;
(e) stripping the rich absorber liquid in the stripping column with a second portion of the natural gas feed to provide a stripped absorber liquid and a stripping column overhead gas comprising carbon dioxide and methane;
(f) recycling the stripping column overhead gas to the synthesis gas generation system; and
(g) recycling the stripped absorber liquid to the absorber column to provide the lean absorber liquid in (c).

12. The method of claim 11 wherein the reaction product comprises a component selected from the group consisting of methanol, dimethyl ether, and synthetic hydrocarbons.

13. The process of claim 11 wherein the stripping column is operated at a higher pressure than the pressure of the absorber column, the rich absorber liquid is pressurized during transfer to the stripping column, and the pressure of the stripped absorber liquid is reduced prior to recycle to the absorber column.

14. The method of claim 11 wherein liquid in the bottom of the stripping column is heated, and the wherein second portion of the natural gas feed is heated prior to introduction into the stripping column.

15. A method for making hydrogen and a pressurized carbon dioxide-containing gas mixture comprising
(a) reforming a hydrocarbon-containing gas to provide a raw synthesis gas containing hydrogen, carbon monoxide, and carbon dioxide;
(b) shifting the raw synthesis gas to convert carbon monoxide into additional hydrogen and carbon dioxide to provide a shifted synthesis gas;
(c) absorbing carbon dioxide from the shifted synthesis gas in a lean absorber liquid in an absorber column to provide a rich absorber liquid and a hydrogen-rich product gas;
(d) pressurizing the rich absorber liquid to provide a pressurized rich absorber liquid and transferring the pressurized rich absorber liquid to a stripping column;
(e) stripping the pressurized rich absorber liquid in the stripping column with a pressurized stripping gas to provide a stripped absorber liquid and a stripping column overhead gas comprising carbon dioxide and stripping gas, wherein the stripping column overhead gas provides the pressurized carbon dioxide-containing gas mixture; and
(f) reducing the pressure of the stripped absorber liquid to provide a reduced-pressure stripped absorber liquid and recycling the reduced-pressure stripped absorber liquid to the absorber column to provide the lean absorber liquid in (c).

16. The method of claim 15 wherein the pressurized stripping gas comprises hydrocarbons containing two or more carbon atoms and the pressurized carbon dioxide-containing gas mixture comprises carbon dioxide and hydrocarbons containing two or more carbon atoms.

17. The method of claim 16 wherein the pressurized carbon dioxide-containing gas mixture is used for enhanced oil recovery.

18. A method for making a reaction product and a pressurized carbon dioxide-containing gas mixture comprising
(a) generating a crude synthesis gas containing hydrogen, carbon monoxide, and carbon dioxide;
(b) introducing the crude synthesis gas into a reaction system and converting the crude synthesis gas into the reaction product and unreacted synthesis gas comprising carbon dioxide;
(c) absorbing a portion of the carbon dioxide in the unreacted synthesis gas in a lean absorber liquid in an absorber column to provide a rich absorber liquid;
(d) pressurizing the rich absorber liquid to provide a pressurized rich absorber liquid and transferring the pressurized rich absorber liquid to a stripping column;
(e) stripping the pressurized rich absorber liquid in the stripping column with a pressurized stripping gas to provide a stripped absorber liquid and a stripping column overhead gas comprising carbon dioxide and stripping gas, wherein the stripping column overhead gas provides the pressurized carbon dioxide-containing gas mixture; and
(f) reducing the pressure of the stripped absorber liquid to provide a reduced-pressure stripped absorber liquid and recycling the reduced-pressure stripped absorber liquid to the absorber column to provide the lean absorber liquid in (c).

19. The method of claim 18 wherein the pressurized stripping gas comprises hydrocarbons containing two or more carbon atoms and the pressurized carbon dioxide-containing gas mixture comprises carbon dioxide and hydrocarbons containing two or more carbon atoms.

20. The method of claim 19 wherein the pressurized carbon dioxide-containing gas mixture is used for enhanced oil recovery.

* * * * *